(12) United States Patent
Schwarzberg et al.

(10) Patent No.: US 8,250,477 B1
(45) Date of Patent: Aug. 21, 2012

(54) MOBILE CLIENT APPLICATION FOR MANAGING USER INTERFACE COMPONENTS

(75) Inventors: Robert J. Schwarzberg, Boca Raton, FL (US); Timothy J. Dion, Parkland, FL (US)

(73) Assignee: Sensei, Inc., Boca Raton, FL (US)

( * ) Notice: Subject to any disclaimer, the term of this patent is extended or adjusted under 35 U.S.C. 154(b) by 904 days.

(21) Appl. No.: 12/264,624

(22) Filed: Nov. 4, 2008

(51) Int. Cl.
*G06F 3/00* (2006.01)
(52) U.S. Cl. ........ 715/760; 715/762; 715/764; 715/205; 715/208
(58) Field of Classification Search .................. 715/760, 715/762
See application file for complete search history.

(56) References Cited

U.S. PATENT DOCUMENTS

| | | |
|---|---|---|
| 6,173,316 B1 * | 1/2001 | De Boor et al. ............... 709/218 |
| 6,717,593 B1 * | 4/2004 | Jennings ....................... 715/760 |
| 2007/0089048 A1 * | 4/2007 | Lacey et al. ................... 715/505 |

* cited by examiner

*Primary Examiner* — Tadeese Hailu
*Assistant Examiner* — Darrin Hope
(74) *Attorney, Agent, or Firm* — Standley Law Group LLP

(57) ABSTRACT

A mobile client application for managing user interface components. Mobile device screen user interface components are defined using XML documents stored at a server. Each user interface component has associated actions including draw when displayed and drawing aspect when selected. A main canvas is initialized to manage all images, text, and widgets. An XML parser pushes the user interface components to the main canvas as they are parsed and retrieved from the server. Drawing occurs after all components have been parsed and created in the main canvas. The entire canvas is drawn but only a portion of the canvas is displayed at any time. Scrolling of user interface component elements is managed by tracking selected items on the screen, and offsetting the main canvas by the number of pixels required to draw the selected element on the screen.

12 Claims, 9 Drawing Sheets

MOBILE CLIENT APPLICATION FOR MANAGING USER INTERFACE COMPONENTS

CROSS-REFERENCE TO RELATED APPLICATIONS

None.

TECHNICAL FIELD

The present invention relates generally to mobile client applications. In particular, the present invention is a mobile client application for managing user interface components that display content from a mobile content provider.

BACKGROUND OF THE INVENTION

As mobile computing services as well as powerful mobile computing devices have proliferated, people increasingly view their cell phones and other mobile devices as their communication medium of choice. Mobile based services are wide ranging and include not only basic telecommunications and text messaging services but also web browsing and information retrieval, games, music, and even movie and television viewing. Many people are choosing to use mobile devices and services over traditional desktop devices and wire services.

Designing user interfaces for mobile devices, however, is more complex than designing for desktops. In addition to much smaller screens, limited input capabilities, and limited memory, the number of devices that a mobile based content provider must support to reach potential customers is substantial. Various mobile client platforms have been developed and adopted by different device manufacturers such that a client application conforming to the platform standards can operate on multiple devices. The mobile platform executes on the mobile operating system for the device but, typically, provides only basic, common functionality for device communication and interaction. Some platforms may provide more than basic features and functionality but they do not nor are they intended to provide all of the features and functionality found in most mobile client applications. Furthermore, each manufacturer may implement the industry standard in a different way such that an application compatible with one implementation of the standard must be modified in some way to operate on a different implementation of the standard.

Developing a client application that conforms to a wide variety of mobile platforms and that provides a wide range of features and functionality is challenging. It can be particularly difficult for mobile content services that provide a graphic-rich user interface as well as a substantial amount of content. Even with the advent of industry standards for mobile devises, a developer that creates a mobile application must "port" that application to each and every device on which the developer would like the application to run. The developer is dependent on each manufacturer's implementation of industry standards and related requirements. For instance, a mobile service provider may require a developer's application to work on a minimum number of phones. The minimum number may be substantial. Currently, one mobile service provider requires support of 34 phones. The mobile service provider may further define this minimum set of phones by manufacturer and model so the developer knows what phones must be supported (and therefore, requires porting of the application) in order to use the service provider's network. If the developer completes the ports to each phone, the cost may be managed but the developer needs to know and understand the nuances the manufacturer implemented around the industry supported specifications and then make adjustments in the code base to accommodate the manufacturer's implementations on that specific phone. Many developers use external third parties for the porting process because porting is a time-consuming activity and may not be the developer's specialty. Additionally, many mobile service providers require the developer to have each port "certified" (e.g., using National Software Testing Labs mobile certification) in order to be allowed on the network. This requirement is also time-consuming and costly.

A common goal for mobile applications is complete device independence. Device independence, however, often requires tradeoffs with respect to performance as well as features and functionality. There is a need for a mobile client application that supports a graphic intensive content service that offers substantial device independence to allow it to operate on many different mobile devices, and that has acceptable performance characteristics on the mobile devices where it executes. There is a need for a mobile client application that abstracts the user interface from the device and places the logic for the device specifics and the end result interface on a server.

SUMMARY OF THE INVENTIVE CONCEPT

The present invention is a mobile client application for managing user interface components. It supports graphic intensive content and is device independent so that it can operate on a variety of different mobile devices. Mobile device screen user interface components are defined using XML documents stored at a server. Each XML document defines one or more user interface components with associated actions or behavior including draw when displayed and drawing aspect when selected. A main canvas memory is initialized at the device to manage all images, text, and widgets generated using the XML schema. An XML parser at the device pushes the user interface components to the main canvas as they are being parsed and retrieved from the server via HTTP or HTTPS. Drawing does not occur while the components are parsed and retrieved. Instead, drawing occurs after all components have been parsed and created in the main canvas memory. The entire canvas is drawn in the main canvas memory but only a portion of the canvas is displayed on the mobile device screen at any time. Scrolling of user interface component elements is managed by tracking the selected items on the screen, and offsetting the main canvas by the number of pixels required to draw the selected element on the screen.

DETAILED DESCRIPTION

Figure 1:
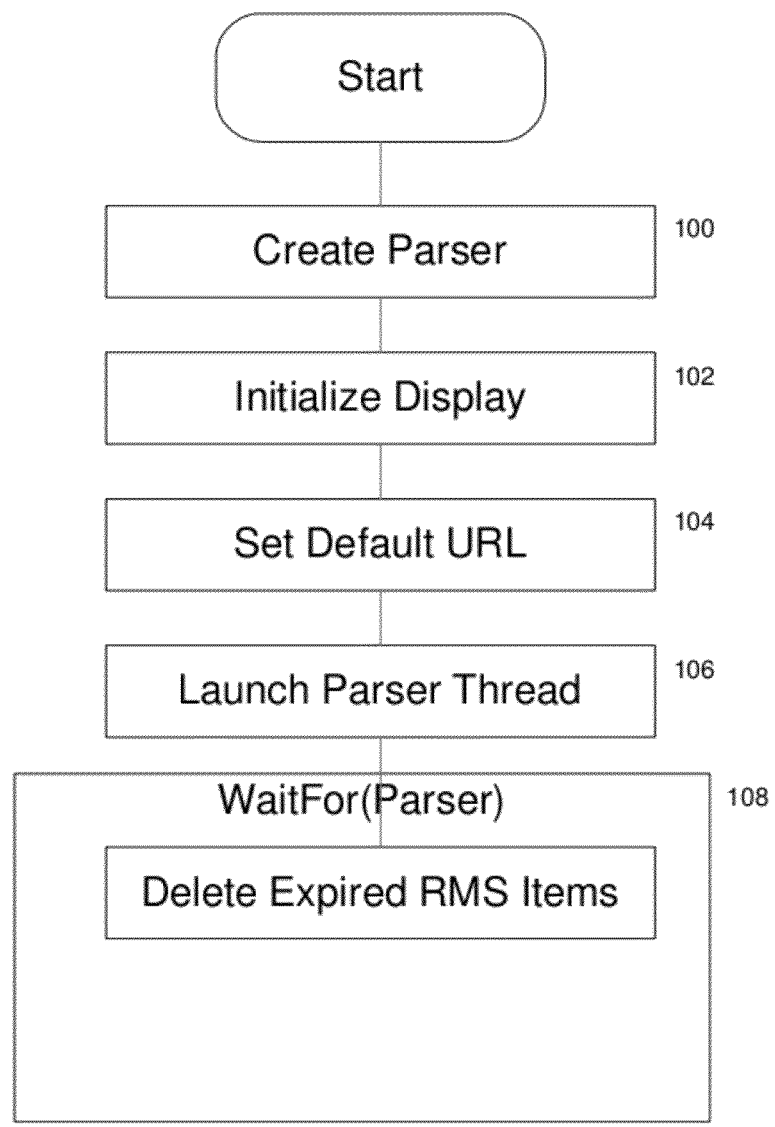
FIG. 1 is a create parser object flow diagram for an example embodiment.

Referring to FIG. 1, a create parser object flow diagram for an example embodiment is shown. FIG. 1 illustrates the main processing unit for the client application (i.e., SUITE). Upon initialization SUITE creates a parser object 100, initializes the mobile screen display 102, and sets the default URL value 104. The default URL value contains none or several parameters that are passed to a server-based infrastructure to determine the contents of the first screen (e.g., Login). Once the parser is launched 106 and completed, images or data stored in a device-based Record Management System which have already expired are then deleted 108.

Figure 2:
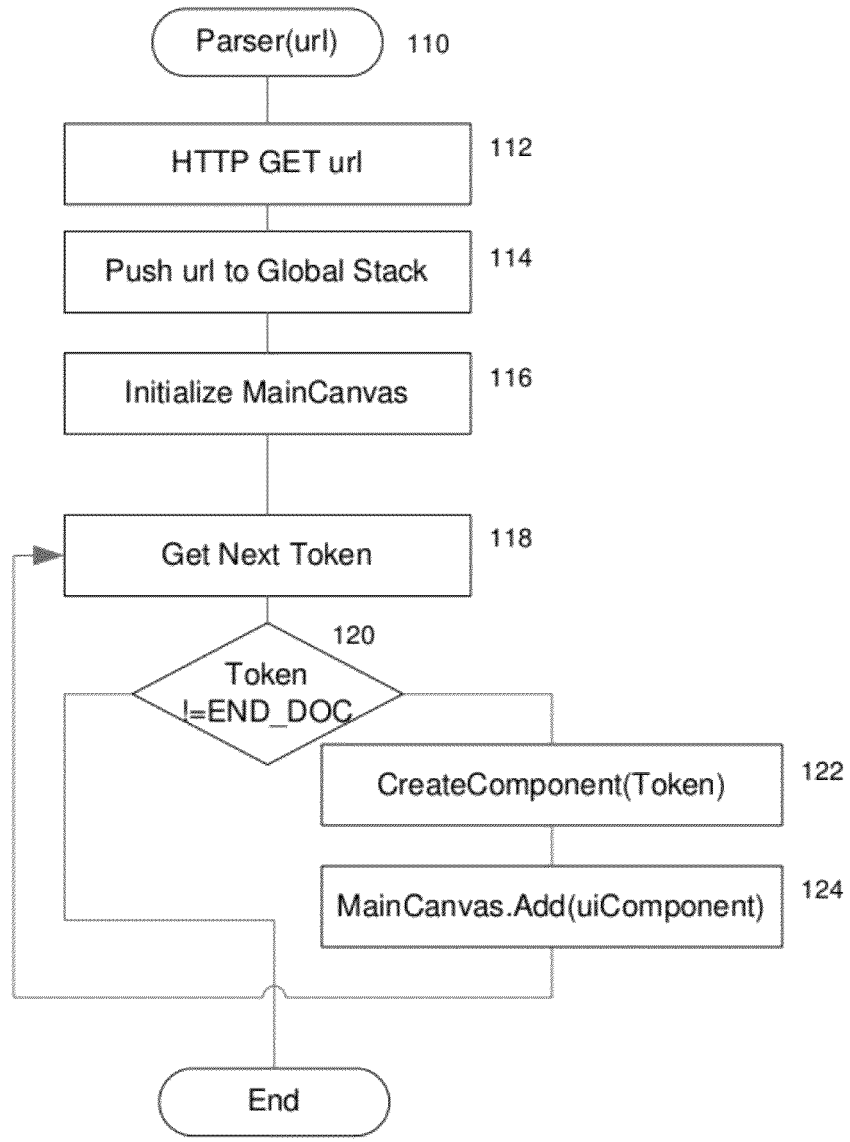
FIG. 2 is a parsing tags flow diagram for an example embodiment.

Referring to FIG. 2, a parsing tags flow diagram for an example embodiment is shown. Upon creation of the XML Parser 110 which processes all tags contained by a server-generated content, a set of internal components are created according to a matching tag or tags in the XML document. FIG. 2 depicts the logic associated with this process. As a first step, an HTTP or HTTPS link is created to request a URL 112. This URL may be a default URL (e.g., Login) or any URL contained in any of the XML data retrieved from the server. Once this URL is known, the value is pushed to a "Global Stack," 114 which is then used for navigation within the mobile client application. One of the main components is the main canvas memory (MainCanvas). The MainCanvas is initialized 116 to paint all images, text, and widgets generated thru the XML schema. Table 1 shows a sample XML page which is used by the mobile client application.

TABLE 1

Sample XML Page

```
<Screen>
   <next>SenseiScreen1</next>
   <name>SenseiScreen</name>
<image>
<name> image001 </name>
<x>10</x>
<y>10</y>
<version>1.0</version>
<url>http://www.sensei.com/AppMainLogo.png</url>
</image>
<text>
<name> text001 </name>
<x> 10 </x>
<y> 100 </y>
<color> #BBDDAA </color>
<style>BOLD</style>
<size>LARGE</large>
<data>SENSEI INC </data>
</text>
</screen>
```

User interface components that may be supported include: Input Text Box; String; Image; Button; Action Button; and Radio Button.

Upon retrieval of the XML-defined page, the mobile client application examines each tag 118, checks for an end of document token 120, and creates associated user interface components 122 until the end of document token is found. Most of the visualized components are derived from the uiComponent class which defines the basic action or behavior per component, including draw when displayed and drawing aspect when selected. All components are pushed to the main-Canvas 124 as they are being parsed and retrieved from the server via HTTP or HTTPS. Drawing does not occur here.

Figure 3A:
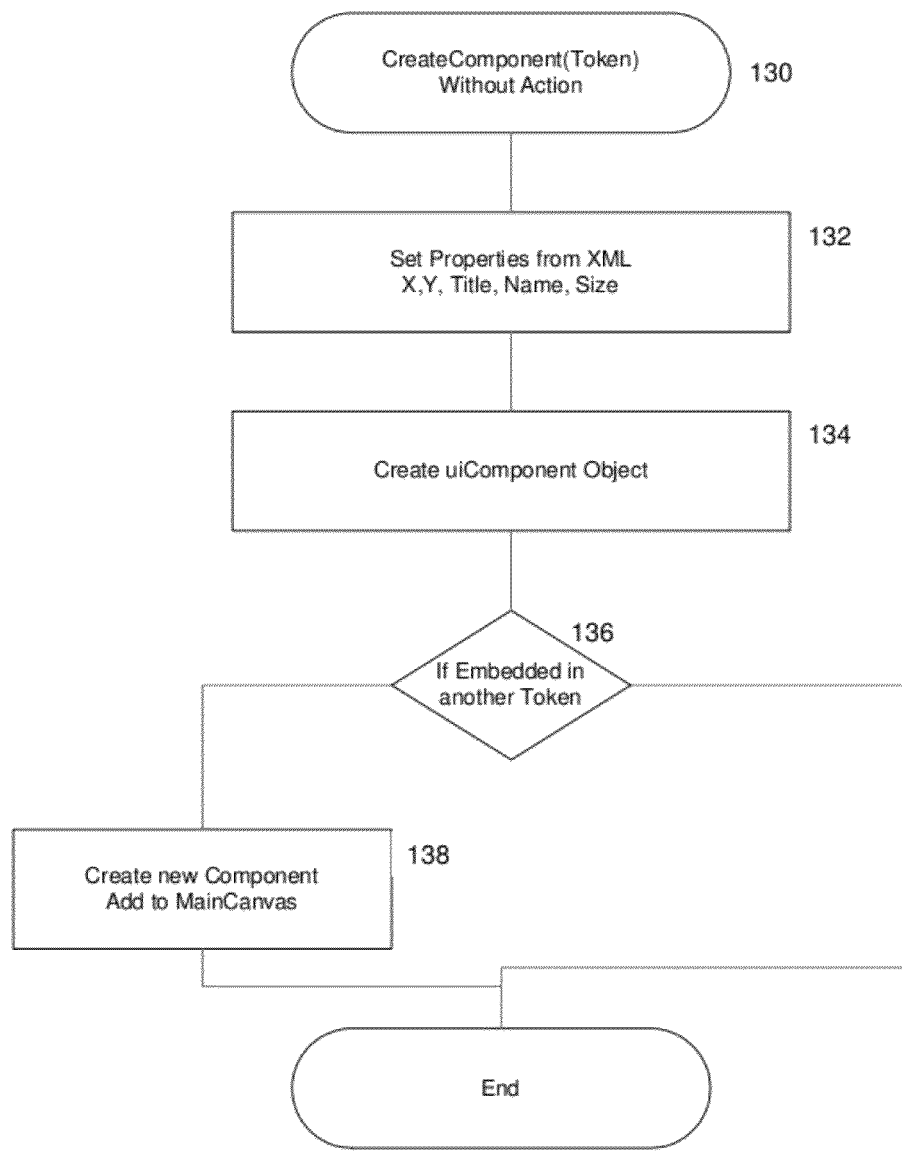
FIG. 3 is a component creation flow diagram for an example embodiment.
Figure 3B:
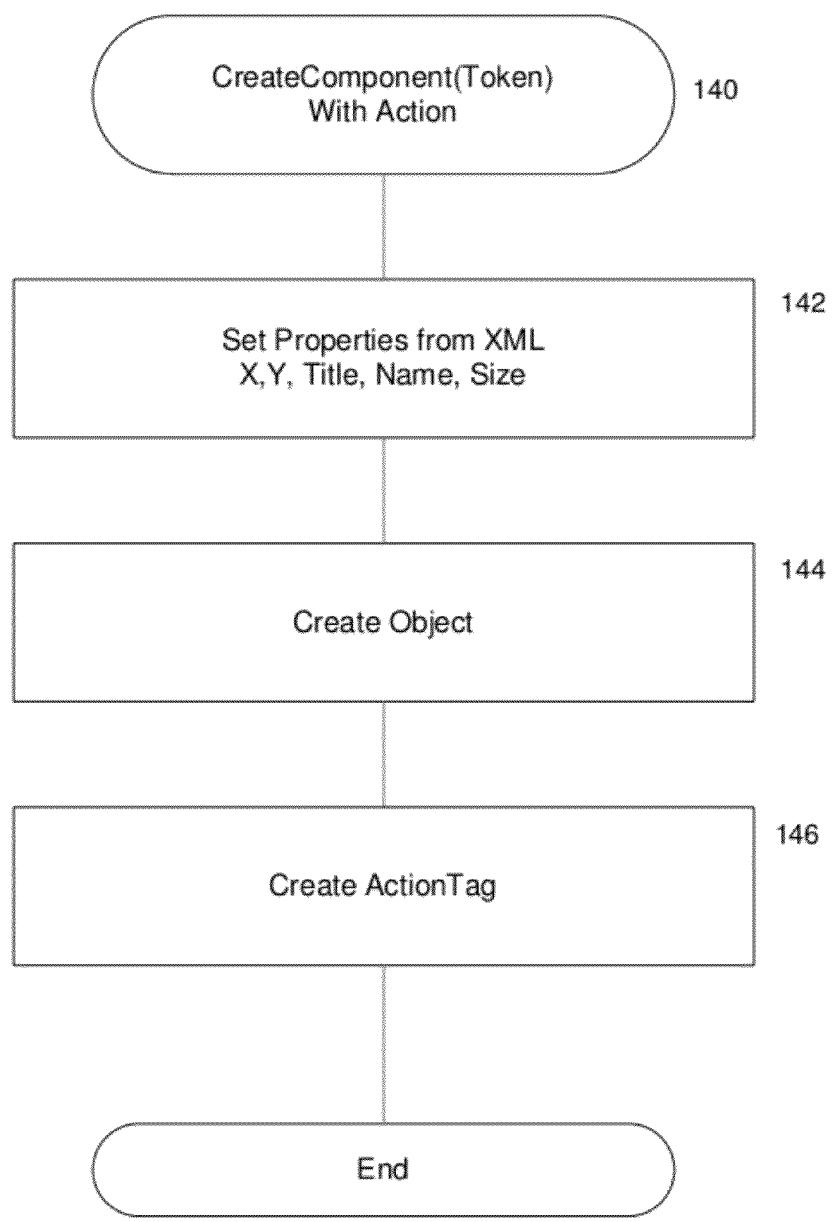

Referring to FIG. 3A, a component creation flow diagram for an example embodiment is shown. FIG. 3A illustrates generic component creation without action 130. When components are created they follow a basic logic, defined in FIG. 3A. In an example embodiment, properties from the XML document include component position data (X and Y coordinates), title, name, and size 132. When a component is created 134, it may or may not be part of an embedded tag (e.g., button that contains text in which text is its own item). A simple flag is used with a pull parser to determine if the information being parsed from the XML document belongs to a new component or if it is part of a different component 136. This is also the case when a component has an associated action. An action does not display anything on the screen but allows the component to execute a task (e.g., Go to a server, Obtain GPS information). The action is then associated to that particular component, as shown in FIG. 3B. The new component is then added to the MainCanvas object 138.

Referring to FIG. 3B, a component creation with an Action Tag flow diagram for an example embodiment is shown. FIG. 3B illustrates generic component creation with action 140. In the example shown, properties from the XML page include component position data (X and Y coordinates), title, name, and size 142. The object is created 144 followed by the Action Tag 146.

Figure 4:
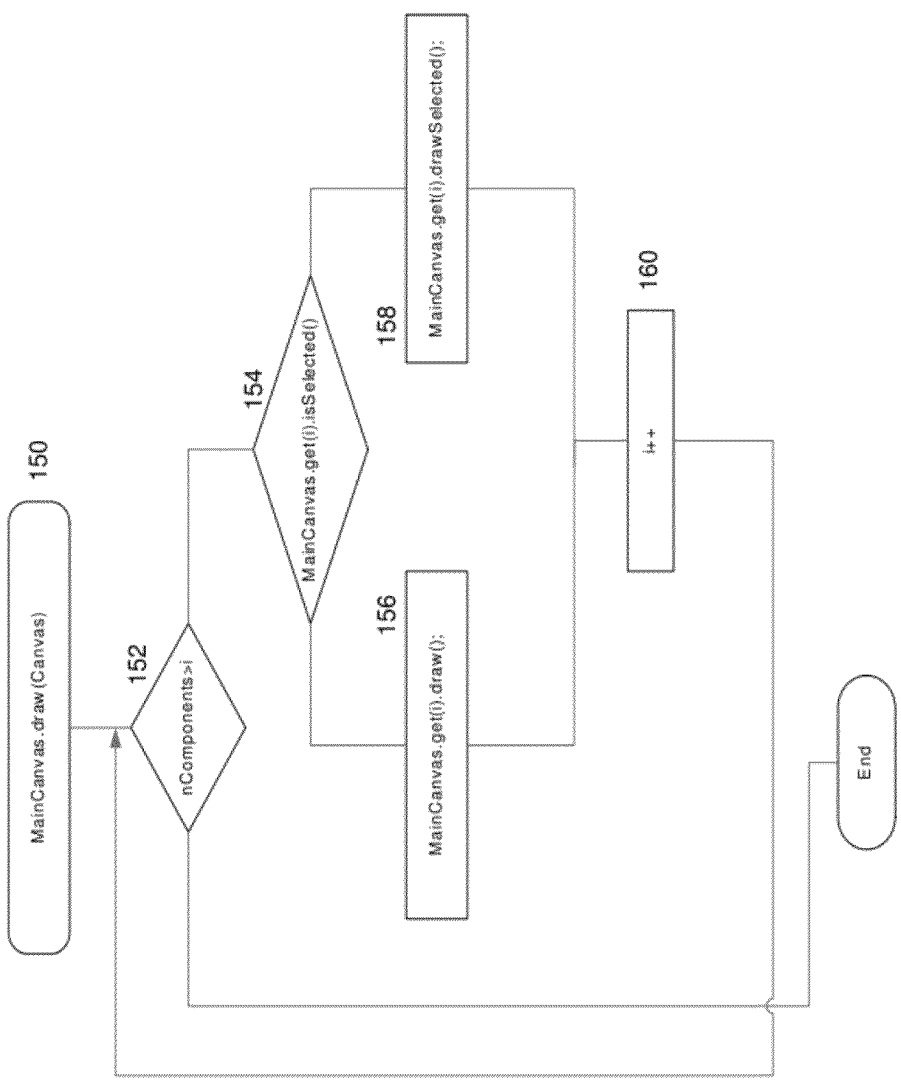
FIG. 4 is a drawing flow diagram for an example embodiment.

Referring to FIG. 4, a drawing flow diagram for an example embodiment is shown. Once all components have been parsed and created, drawing occurs by traversing a vector or array of uiComponent elements 152 that are part of the mainCanvas object 150. A different drawing algorithm 156, 158 may be used to draw the component when selected 154. A counter for the number of components in the object is incremented 160 and process continues for all components of the object 152.

Figure 5:
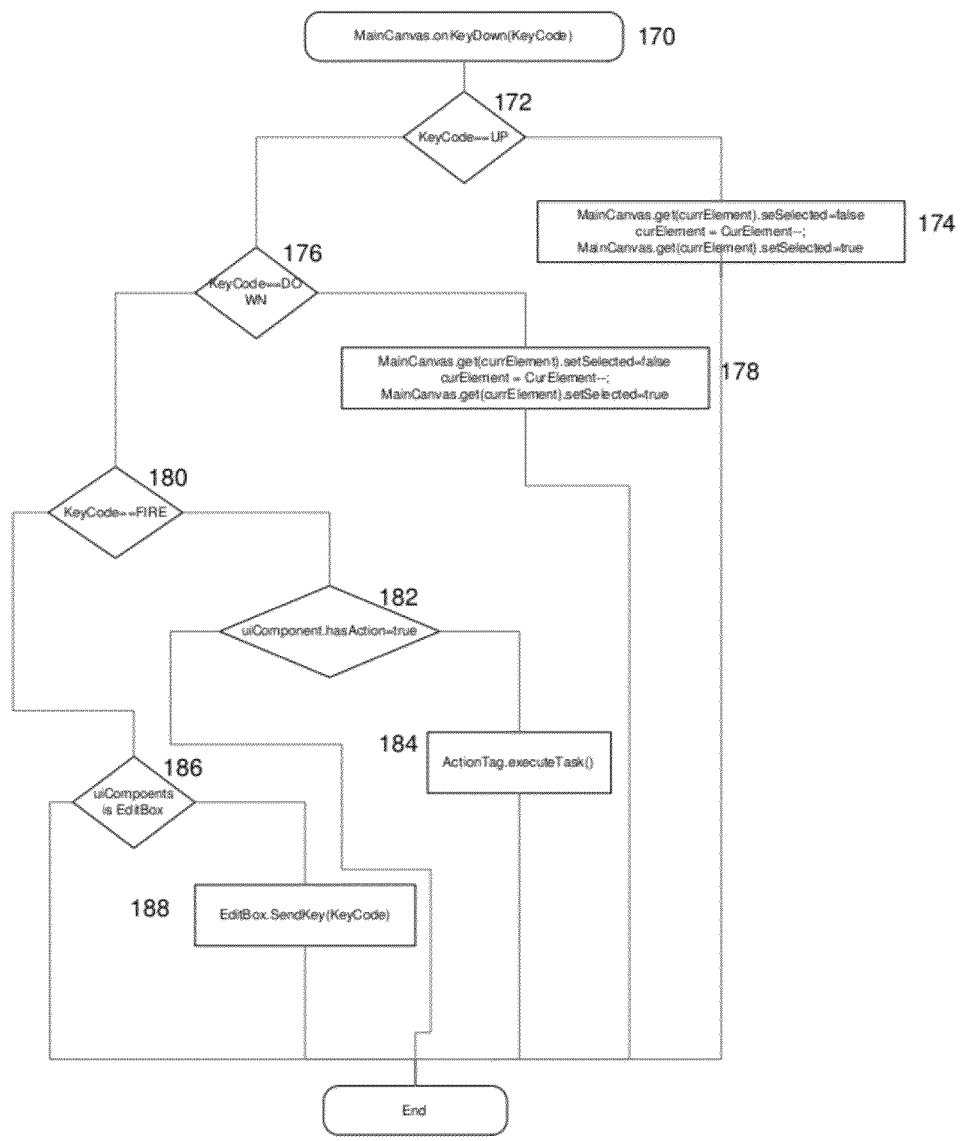
FIG. 5 is a key events, selectivity, and action control flow diagram for an example embodiment.

"Selectivity" is defined in FIG. 5 as a function of the key events received by the midlet or application. The entire Canvas is drawn. What is displayed, however, is only a fraction of the total memory used when the MainCanvas object was created. In general, the X amounts of screens can be drawn, and it is clear from the diagram that main canvas could also be an array of canvases in which a URL could be used as a key element to cache multiple screens when retrieving data. In other words, parsing creates objects not only for one XML page but for several pages. Additionally, in FIGS. 3A and 3B, when images are retrieved from a server, those images are spawned into threads used to download contents of the widget in use. If the widget contents are found in the Record Management System, this process is not performed and instead locally stored files are used.

Referring to FIG. 5, a key events, selectivity, and action control flow diagram for an example embodiment is shown. FIG. 5 illustrates the process of selecting components and drawing them. Once a key event is generated and a change is detected 170, a new paint method is called in such a form that the main canvas is updated. Scrolling of user interface component elements is handled by keeping track of the selected components on the screen, and offsetting the main canvas by the number of pixels required to draw the selected component on the screen.

Therefore, a key UP event 172 simply decreases the value of the uiComponent being selected 174, and a key DOWN 176 increases it by one 178. By default, only a few elements are selectable, but all of them could be selectable. The same logic is then used to manage "OK" or "FIRE" (accept) key on the handset 180. If the component was created with an Action 182, this Action is executed 184; if not, this is ignored. Similarly, special handling is required for an EditBox item 186, for which key input events are forwarded to the EditBox component 188.

Figure 6:
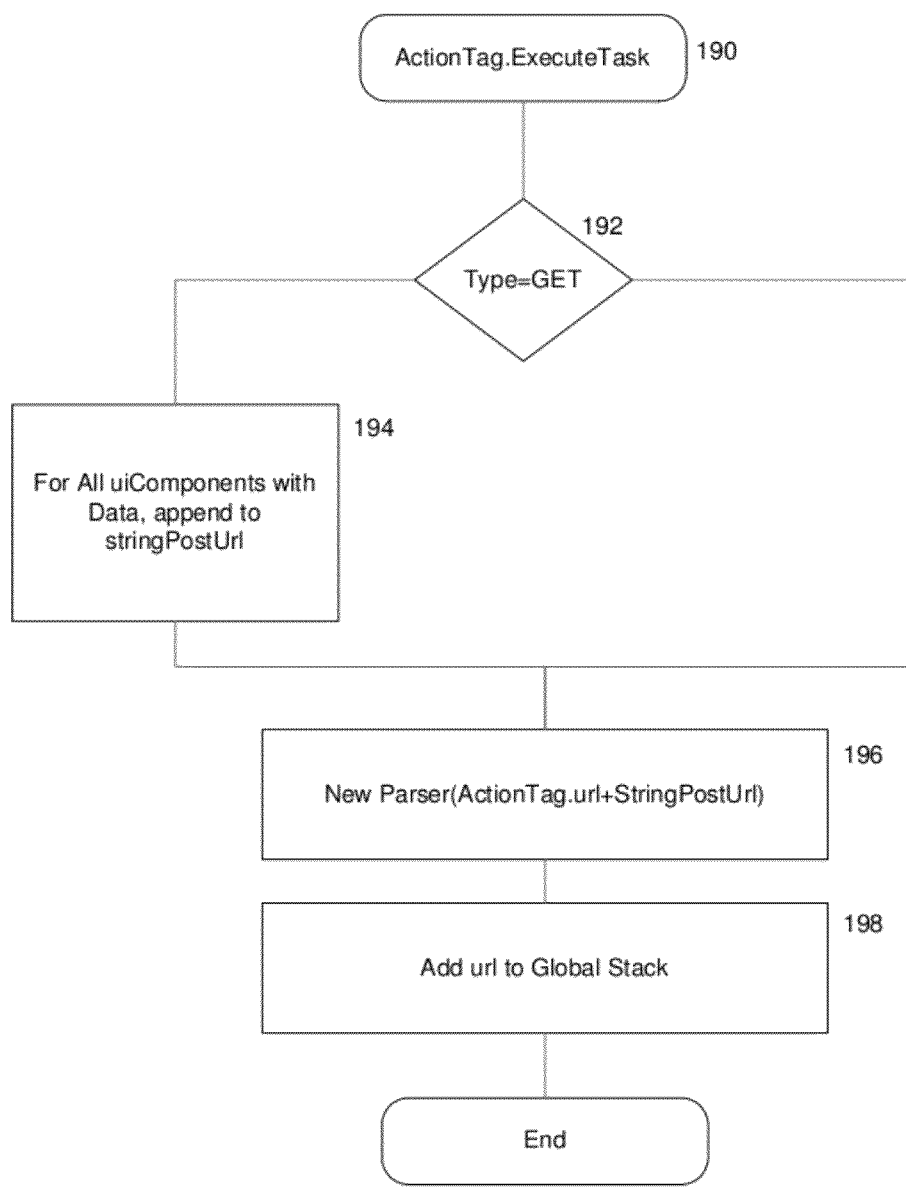
FIG. 6 is an action tag flow diagram for an example embodiment.

Referring to FIG. 6, an action tag flow diagram for an example embodiment is shown. For example, a FIRE key triggers the process 190 shown in FIG. 6 in which a new Parser is created and a new URL is pushed to the stack with the contents of the Action URL. Additionally, if the type of method is not "GET," the ActionTag traverses all uiComponents 194 looking for elements which might need to be posted back to the server (e.g., EditBox), parses the name and value entered on the screen 196, and could either append the item to a HTTP GET URL or create a POST to the server 198.

Figure 7:
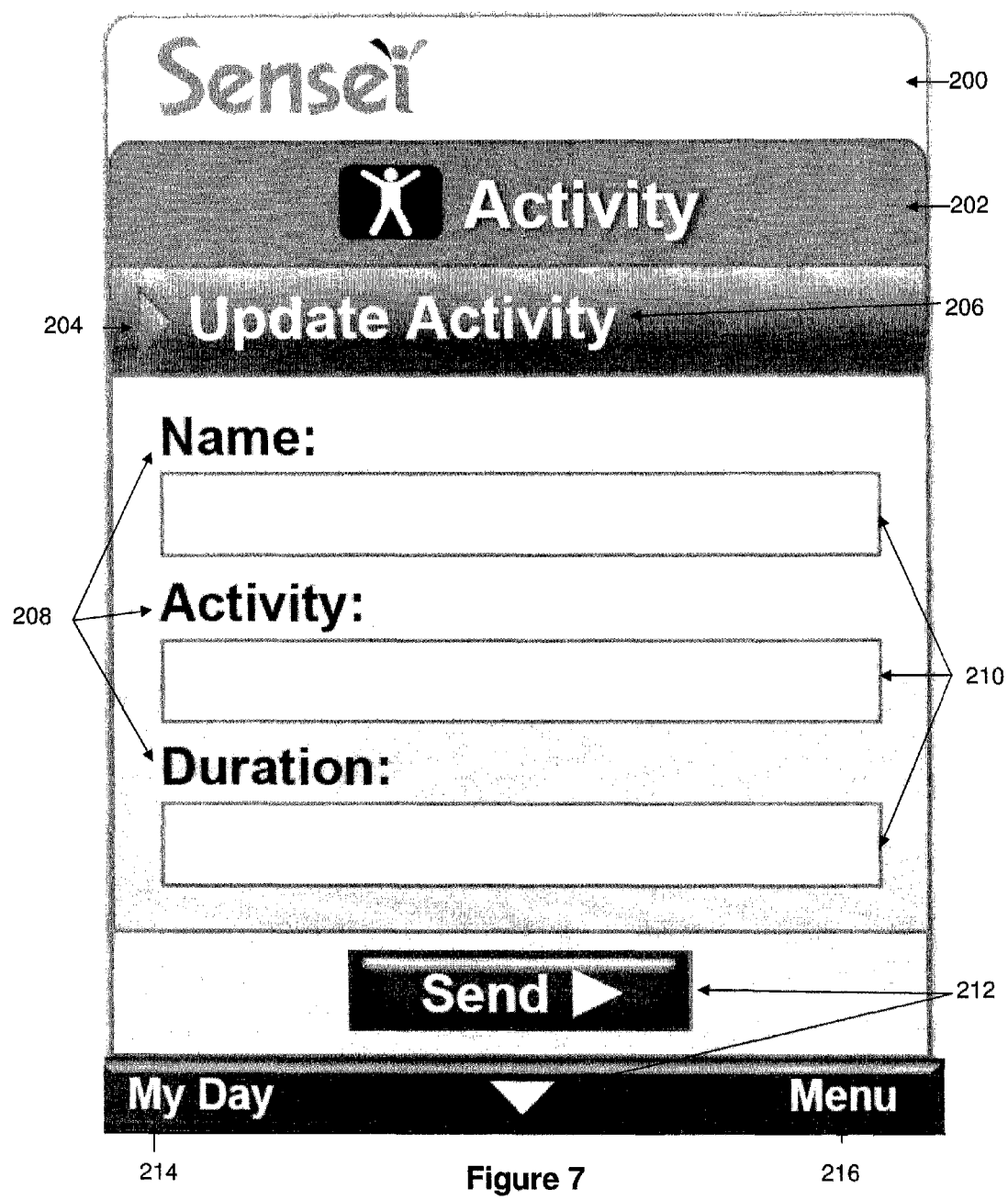
FIGS. 7 and 8 are sample mobile client user interface screens according to an example embodiment.
Figure 8:

Referring to FIGS. 7 and 8, sample mobile client user interface screens according to an example embodiment are shown. FIGS. 7 and 8 illustrate the types of user interface components and elements that may be used to create many screens that support user interaction with a remote site. Referring to FIG. 7, each screen may comprise a plurality of components and elements. Top portions of the screen 200, 202 may be used to identify a service (Sensei) and sub-service (Activity) for a remote application. Both text and graphics may be displayed in each portion 200, 202. A third portion of the screen may comprise text 206 and a widget 204 that supports user interaction. Another portion of the screen may comprise text boxes 210 and labels 208 that support entry of user data. The bottom portions of the screen may comprise additional text 214, 216 as well as widgets 212.

FIG. 8 also illustrates the placement of user interface components and elements on a mobile device screen according to the present invention. The top portions of the screen 220, 222 may be used to identify a service (Sensei) and sub-service (My Day) as well as to display a message 224. Additional portions of the screen may have text and widgets to allow a user to complete certain activities such as to view messages 226 or to view details related to different activities 228. Finally, the bottom portion may have additional text and widgets for navigating the client application 230.

Display details related to the position, size, etc. for each component shown in FIGS. 7 and 8 may vary for different mobile devices so that the resulting display generated by the mobile client application at each device is similar across different devices. The ability of the mobile client application to accept user interface component and display data from a content service and to render appropriate screen displays allows the content service to support many devices and furthermore, to support new mobile devices as they are developed.

The present invention is a mobile client application that abstracts the user interface from the device and places the logic for the device specifics and the end result interface on a server. It allows a single client application to operate on a variety of mobile devices, even if the mobile devices use different implementations of known industry standards.

It will be recognized by those of skill in the art that various modifications, alternative implementations, and equivalents may be used without departing from the spirit of the invention. Accordingly, the above description does not limit the scope of the invention, which is defined in the following claims.

The invention claimed is:

1. A method for displaying on a mobile device a user interface with a plurality of user interface components comprising:
   (a) receiving at said mobile device from a server a URL for accessing XML documents defining a plurality of user interface components for generating a screen on said mobile device;
   (b) adding said URL to a memory stack at said mobile device;
   (c) initializing at said mobile device a canvas object for holding said plurality of user interface components at said mobile device;
   (d) parsing at said mobile device XML documents defining user interface components wherein parsing a XML document comprises:
      i. extracting a token from said XML document;
      ii. creating at said mobile device a user interface component based on said token;
      iii. adding properties for said user interface component to said canvas object; and
      iv. repeating steps i-iii until an end for said XML document is reached;
   (e) drawing all of said user interface components of said canvas object according to a number of pixels for each component and a drawing algorithm
   (f) selecting a subset of user interface components from said canvas object for display on a screen on the mobile device display;
   (g) displaying said subset of user interface components on said screen for said mobile device;
   (h) receiving input related to a key event at said mobile device;
   (i) selecting a new subset of user interface components from said canvas object to display on said screen; and
   (j) replacing the user interface components appearing on said screen for said mobile device from said canvas object according to said number of pixels required to draw the user interface components on said screen.

2. The method of claim 1 wherein said user interface components are selected from the group consisting of an input text box, an edit box, a string, an image, a button, an action button, and a radio button.

3. The method of claim 1 wherein said key event is selected from the group consisting of key up, key down, and accept.

4. The method of claim 1 further comprising:
   (k) receiving an accept key event;
   (l) determining a selected user interface component on said screen in response to said key event;
   (m) determining a number of pixels required to draw said selected user interface component on said screen; and
   (n) replacing a user interface component appearing on said screen with a number of pixels required for said selected component on said screen from said canvas object according to said number of pixels required to draw said selected component.

5. The method of claim 1 wherein properties for said user interface component comprises position data, title, name, and size.

6. The method of claim 5 wherein position data for said user interface component comprises X and Y coordinates.

7. A method for providing user interface components of a user interface to a mobile device comprising:
   (a) creating a plurality of XML documents defining user interface components for a screen on said mobile device;
   (b) transferring from a server to said mobile device a client application for execution at said mobile device, said client application adapted to receive and parse said XML documents;
   (c) transferring from a server to said mobile device a URL for accessing said XML documents defining said user interface components;
   (d) receiving from said mobile device at said server a request for at least one of said XML documents associated with said URL;

(e) transferring from said service to said mobile device said at least one XML document wherein said client application responds by:
 (1) initializing at said mobile device a canvas object for holding a plurality of user interface components at said mobile device;
 (2) parsing at said mobile device XML documents defining user interface components wherein parsing a XML document comprises:
  (i) extracting a token from said XML document;
  (ii) creating at said mobile device a user interface component based on said token;
  (iii) adding properties for said user interface component to said canvas object; and
  (iv) repeating steps i-iii until an end for said XML document is reached;
 (3) drawing all of said user interface components of said canvas object wherein drawing said user interface components comprises:
  (i) selecting a user interface component from said canvas object;
  (ii) invoking a drawing algorithm to draw said user interface component by using a number of pixels to draw the component on a screen for said mobile device; and
  (iii) repeating steps i and ii for all user interface components in said canvas object;
 (4) selecting a subset of user interface components from said canvas object;
 (5) displaying said subset of user interface components on said screen for said mobile device;
 (6) receiving input related to a key event at said mobile device;
 (7) selecting a new subset of user interface components from said canvas object to display on said screen; and
 (8) replacing the subset of user interface components appearing on said screen for said mobile device from said canvas object according to said number of pixels required to draw the new subset of user interface components on said screen.

8. The method of claim 7 wherein said user interface components are selected from the group consisting of an input text box, an edit box, a string, an image, a button, an action button, and a radio button.

9. The method of claim 7 wherein said key event is selected from the group consisting of key up, key down, and accept.

10. The method of claim 7 wherein step (e) further comprises:
 (9) receiving an accept key event;
 (10) determining a selected user interface component on said screen in response to said key event;
 (11) determining a number of pixels required to draw said selected user interface component on said screen; and
 (12) replacing a user interface component appearing on said screen with a number of pixels required for said selected component on said screen from said canvas object according to said number of pixels required to draw said selected component.

11. The method of claim 7 wherein properties for said user interface component comprising position data, title, name, and size.

12. The method of claim 11 wherein position data for said user interface component comprises X and Y coordinates.

* * * * *